United States Patent
Lou et al.

(10) Patent No.: US 10,206,196 B2
(45) Date of Patent: Feb. 12, 2019

(54) DYNAMIC WIRELESS MULTICAST ORTHOGONAL FREQUENCY DIVISION MULTIPLE ACCESS ARCHITECTURE

(71) Applicant: AT&T Intellectual Property I, LP, Atlanta, GA (US)

(72) Inventors: Yuang Lou, Dunwoody, GA (US); Douglas A. Duet, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 706 days.

(21) Appl. No.: 14/521,606

(22) Filed: Oct. 23, 2014

(65) Prior Publication Data
US 2016/0119898 A1    Apr. 28, 2016

(51) Int. Cl.
  H04W 72/00    (2009.01)
  H04L 12/18    (2006.01)

(52) U.S. Cl.
  CPC .......... H04W 72/005 (2013.01); H04L 12/189 (2013.01)

(58) Field of Classification Search
  CPC ............................ H04W 72/005; H04L 12/189
  See application file for complete search history.

(56) References Cited

U.S. PATENT DOCUMENTS

| | | | |
|---|---|---|---|
| 5,038,403 A | 8/1991 | Leitch | |
| 5,485,463 A | 1/1996 | Godoroja | |
| 5,535,215 A | 7/1996 | Hieatt, III | |
| 5,546,443 A | 8/1996 | Raith | |
| 5,802,044 A | 9/1998 | Baum et al. | |
| 5,878,324 A | 3/1999 | Borth et al. | |
| 5,909,651 A | 6/1999 | Chander et al. | |
| 5,983,005 A | 11/1999 | Monteiro et al. | |

(Continued)

FOREIGN PATENT DOCUMENTS

| AU | 2014203181 A1 | 12/2008 |
|---|---|---|
| CN | 202475668 U | 10/2012 |

(Continued)

OTHER PUBLICATIONS

Araniti, Giuseppe et al., "A Low-Complexity Resource Allocation Algorithm for Multicast Service Delivery in OFDMA Networks," IEEE Transactions on Broadcasting, vol. 60, No. 2, Jun. 2014, pp. 358-369.

(Continued)

*Primary Examiner* — Siming Liu
(74) *Attorney, Agent, or Firm* — Zagorin Cave LLP

(57) ABSTRACT

A dynamic wireless multicast service system is described. A method includes transmitting in a first service area, multicast data using a first orthogonal frequency division multiple access (OFDMA) resource block associated with first resource allocation control information in response to a first user request for a multicast service. The method includes providing the first resource allocation control information to a second user in the first service area in response to the second user requesting the multicast service. The method may include releasing the first OFDMA resource block in response to termination of the multicast service by all users in the first service area. The method may include transmitting in the first service area, unicast data using the first OFDMA resource block after the releasing.

15 Claims, 8 Drawing Sheets

(56) References Cited

U.S. PATENT DOCUMENTS

| | | | |
|---|---|---|---|
| 6,026,289 | A | 2/2000 | Zellner et al. |
| 6,175,550 | B1 | 1/2001 | van Nee |
| 6,519,262 | B1 | 2/2003 | Stephens et al. |
| 6,535,552 | B1 | 3/2003 | Pessoa |
| 6,574,292 | B2 | 6/2003 | Heinonen |
| 6,885,630 | B2 | 4/2005 | Kostic et al. |
| 7,079,503 | B2 | 7/2006 | Kostic et al. |
| 7,496,062 | B2 | 2/2009 | Kostic et al. |
| 7,787,407 | B2 | 8/2010 | Kostic et al. |
| 8,320,948 | B2 | 11/2012 | Li et al. |
| 8,498,227 | B2 | 7/2013 | Nentwig et al. |
| 8,538,444 | B2 | 9/2013 | Lee et al. |
| 8,571,002 | B2 | 10/2013 | Kostic et al. |
| 8,665,771 | B2 | 3/2014 | Nam et al. |
| 8,675,605 | B2 | 3/2014 | Charbit et al. |
| 8,768,373 | B2 | 7/2014 | Soliman et al. |
| 2004/0085926 | A1* | 5/2004 | Hwang .................. H04W 4/06 370/328 |
| 2007/0291674 | A1* | 12/2007 | Cheng .................. H04L 12/189 370/312 |
| 2008/0144612 | A1 | 6/2008 | Honkasalo et al. |
| 2008/0186842 | A1 | 8/2008 | Chong et al. |
| 2010/0159822 | A1 | 6/2010 | Lim et al. |
| 2010/0234040 | A1 | 9/2010 | Palanki et al. |
| 2011/0255425 | A1 | 10/2011 | Pikkarainen et al. |
| 2013/0095838 | A1* | 4/2013 | Uemura ................ H04W 36/30 455/443 |
| 2013/0231124 | A1 | 9/2013 | Vrzic et al. |
| 2013/0315124 | A1 | 11/2013 | Rapaport et al. |
| 2013/0315183 | A1 | 11/2013 | Xiang et al. |
| 2014/0050207 | A1 | 2/2014 | Kostic |
| 2014/0056224 | A1 | 2/2014 | Rubin et al. |
| 2014/0112236 | A1* | 4/2014 | Jung .................... H04W 76/40 370/312 |
| 2014/0295834 | A1* | 10/2014 | Lee .................... H04W 76/025 455/434 |
| 2015/0043491 | A1* | 2/2015 | Eng ....................... H04W 16/14 370/329 |

FOREIGN PATENT DOCUMENTS

| | | |
|---|---|---|
| CN | 203104501 U | 7/2013 |
| EP | 2590439 A1 | 5/2013 |
| GB | 2505752 A | 3/2014 |
| KR | 101410834 B1 | 6/2014 |
| WO | 9802982 A1 | 1/1998 |
| WO | WO 2010091713 A1 | 8/2010 |
| WO | WO 2011097523 A1 | 8/2011 |
| WO | WO 2013060350 A1 | 5/2013 |
| WO | WO 2013093462 A1 | 6/2013 |
| WO | WO 2013116556 A2 | 8/2013 |

OTHER PUBLICATIONS

Boudreau, Gary et al., "Interference Coordination and Cancellation for 4G Networks," IEEE Communications Magazine, Apr. 2009, pp. 74-81.

Gosh, Arunabha et al., "Fundamentals of LTE," Pearsons Education, Inc. 2011, 6 pages.

* cited by examiner

DYNAMIC WIRELESS MULTICAST ORTHOGONAL FREQUENCY DIVISION MULTIPLE ACCESS ARCHITECTURE

BACKGROUND

Field of the Invention

The present disclosure relates to communications technology and more particularly to providing multicast wireless communications services.

Description of the Related Art

In general, trends indicate that wireless video streaming delivery and wireless television broadcasting are becoming the dominant type of wireless data traffic. Increases in the demand for wireless video streaming delivery will further increase wireless traffic growth and increase the scarcity of electromagnetic spectrum. Since wireless data traffic volume is growing rapidly, electromagnetic spectrum resources are limited, and the release/allocation of new electromagnetic spectrum to wireless communications is slow, improved solutions are desired.

One technique for attempting to satisfy the growing demand for use of electromagnetic spectrum includes innovated spectrum regulation, e.g., regulatory efforts and radio access network developments in authorized/licensed shared access. Innovated network access architecture is another way to increase the electromagnetic spectrum utilization, improve spectral efficiency, reduce the broadcasting radio transmission power, and lower the noise floor in the radio frequency environment without losing service advantages. Those innovated efforts increase the efficiency of network operation and make network operation much more cost effective.

Obtaining authorization to communicate over regulated electromagnetic spectrum presents a challenge for wireless communications service development. In the United States, the Federal Communications System (FCC) allocates electromagnetic spectrum for communications originating in the United States and encourages spectrum sharing. For example, the FCC has proposed that a Time Division Duplexing (TDD) scheme coexist with other duplexing communications schemes and multi-tiered access systems for a 3.5 GHz Innovation Band. Although implementation of the proposed TDD coexistence is complicated and expensive, the spectrum needs are higher priority and justify the complexity and expense in actual communications systems. Thus, existing spectrum should be used intelligently to achieve high spectrum utilization and high spectral efficiency.

SUMMARY OF EMBODIMENTS OF THE INVENTION

A dynamic wireless multicast service system is described. In at least one embodiment, a method includes transmitting in a first service area, multicast data using a first orthogonal frequency division multiple access (OFDMA) resource block associated with first resource allocation control information in response to a first user request for a multicast service. The method includes transmitting the first resource allocation control information to a second user in the first service area in response to the second user requesting the multicast service. The method may include releasing the first OFDMA resource block in the first service area in response to termination of the multicast service by all users in the first service area. The method may include transmitting in the first service area, unicast data using the first OFDMA resource block after the releasing. The method may include receiving in a second service area proximate to the first service area, a multicast service control signal from the first user. The first user may simultaneously be in the first service area for receiving the multicast data from a multicast service unit and in a second service area for transmitting multicast control signals to the multicast service unit.

In at least one embodiment, an apparatus includes a base station scheduler configured to schedule transmission of multicast data to first user equipment in a first service area using a first orthogonal frequency division multiple access (OFDMA) resource block associated with first resource allocation control information in response to a first user request for a multicast service. The apparatus includes a transmitter configured to provide the first resource allocation control information to a second user in the first service area in response to the second user requesting the multicast service. The base station scheduler may be configured to release the first OFDMA resource block in the first service area in response to termination of the multicast service in the first service area by all users in the first service area. The base station scheduler may be configured to schedule communications of unicast data using the first OFDMA resource block in the first service area after release of the first OFDMA resource block. The apparatus may include a multicast service unit configured to generate a control signal based on position information for user equipment received from a mobility management entity. The apparatus may include a second base station scheduler configured to schedule transmission of the multicast data using a second OFDMA resource blocks associated with second resource allocation control information based on the control signal indicating the first user equipment entering a second service area. The apparatus may include a base station including the base station scheduler and the transmitter. The apparatus may include a second base station configured to receive multicast service control signals from the first user. The first user may be in the first service area for multicast service from a multicast service unit and the first user may be in a second service area for transmitting multicast control signals to the multicast service unit.

In at least one embodiment, a method includes receiving multicast data using a first orthogonal frequency division multiple access (OFDMA) resource block associated with first resource allocation control information in response to a first user request for the multicast data in a first service area. The method includes receiving unicast data using the first OFDM resource blocks after release of the first OFDMA resource block from communication of the multicast data. The method may include receiving the multicast data using second OFDMA resource blocks in a second service area in response to entering the second service area from the first service area. The method may include transmitting multicast control information to a base station in a second service area. The first user may simultaneously be in the first service area for receiving multicast data from a multicast service unit and in the second service area for transmitting multicast control information to the multicast service unit. The first service area may be associated with a first base station and the second service area may be associated with a second base station.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
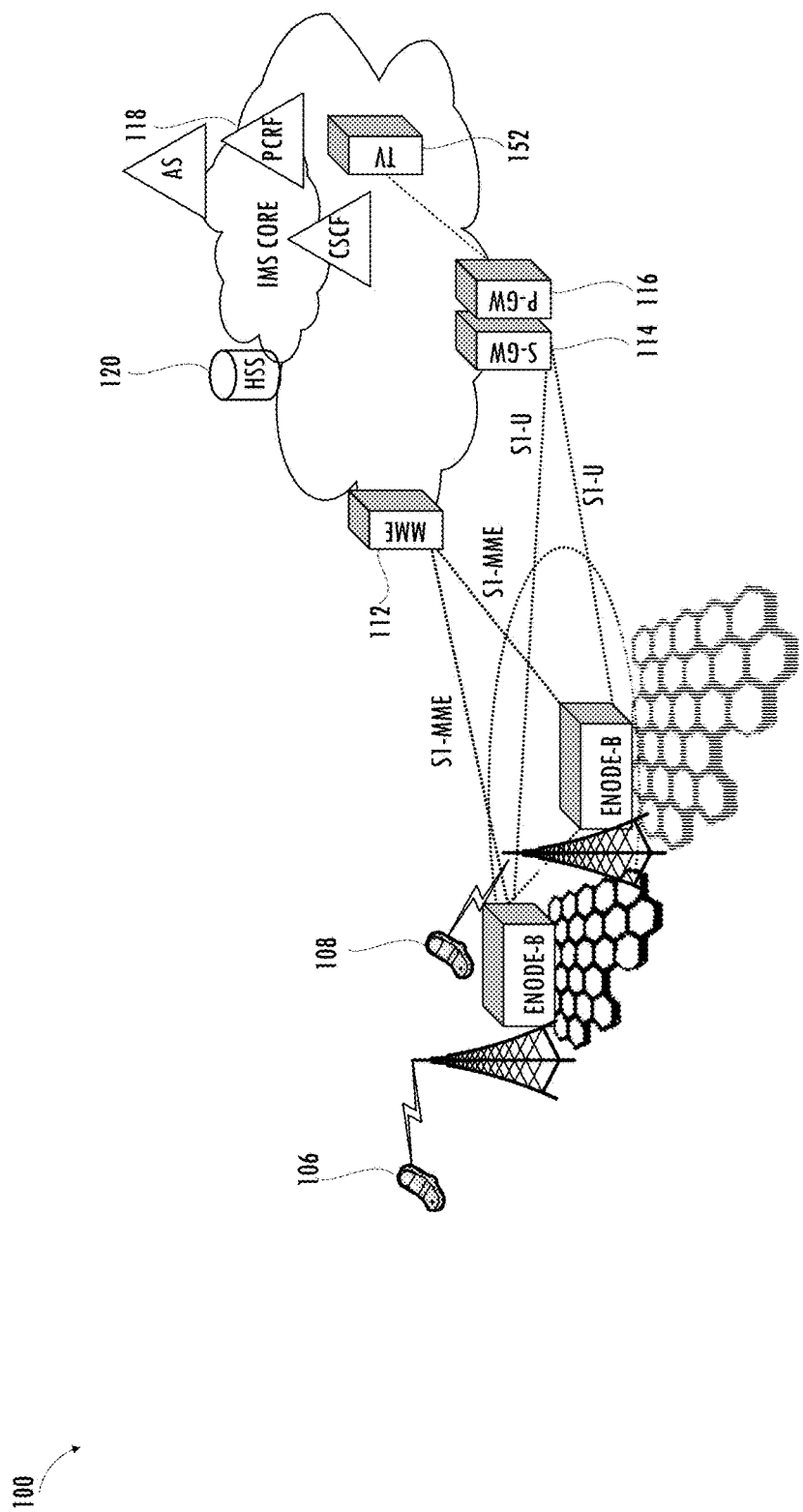
FIG. 1 illustrates an exemplary wireless communications network.

Referring to FIG. 1, wireless communications network 100 includes an evolved packet core network including mobility management entity 112, serving gateway 114, packet data network gateway 116, and policy and charging rules function (PCRF) 118. Mobility management entity 112 performs signaling and control functions to manage access to network connections by user equipment 106 and user equipment 108, assignment of resources to user equipment 106 and user equipment 108, and mobility management functions, e.g., idle mode location tracking, paging, roaming, and handovers. Mobility management entity 112 controls control plane functions related to subscriber and session management for service to user equipment 106 and user equipment 108. In addition, mobility management entity 112 provides security operations including providing temporary identities for user equipment, interacting with home subscriber server 120 for authentication, and negotiation of ciphering and integrity protection algorithms. User equipment 106 and 108 may be any wireless device directly used by an end-user to communicate (e.g., hand-held telephone, smartphone, laptop computer, tablet, wearable device, or other device configured with wireless communications equipment including a wireless transmitter and a wireless receiver). As referred to herein, a session is an active communication of data over a network between two devices and may include a first data stream from a first device to the second device and a second data stream from the second device to the first device. It may be possible to have more than one session between two devices simultaneously.

Mobility management entity 112 selects suitable serving and Packet Data Network (PDN) gateways, and selects legacy gateways for handover to other networks. Mobility management entity 112 may manage a plurality (e.g., thousands) of base stations (e.g., enhanced Node-B or eNode-B elements) or evolved packet data gateway elements. Mobility management entity 112 manages user plane mobility. Serving gateway 114 routes and forwards user data packets. Serving gateway 114 also behaves as a mobility anchor during inter-eNode-B handovers and as the anchor for mobility between Long Term Evolution (LTE) and other 3GPP wireless technologies. Packet data network gateway 116 provides connectivity from user equipment 106 and user equipment 108 to external packet data networks by being the point of exit and entry of traffic for the user equipment. For example, packet data network gateway 116 provides connectivity to television content controller and server 152. Policy and charging rules function 118 interfaces with packet data network gateway 116 and supports service data flow detection, policy enforcement, and flow-based charging. Home subscriber server 120 is a central database that stores user-related and subscription-related information. Home subscriber server 120 provides call and session establishment support, user authentication, and access authorization.

Still referring to FIG. 1, a broadcast data service communicates between television content controller and server 152 and user equipment 106 and 108 via one or more eNode-B using Multimedia Broadcast Multicast Service (MBMS) over 3GPP cellular networks (e.g., eMBMS, the Long Term Evolution (LTE) version of MBMS) and broadcast data services over a Multicast-Broadcast Single-Frequency Network (MBSFN), which supports broadcast-only services and is based on a Single Frequency Network (SFN) based Orthogonal Frequency-Division Multiplexing (OFDM) waveform.

Multicasting and broadcasting services each require designated electromagnetic spectrum. As referred to herein, "multicasting service" refers to sending a communication from a network node to multiple end-points of a selected group of end-points (e.g., user equipment) simultaneously, "broadcasting service" refers to sending a communication from a single network node simultaneously to all members of a group of end-points connected to the network, and "unicasting service" refers to point-to-point communication between one network device and a second network device. Although multicasting and broadcasting services have differences, both services will be referred to herein interchangeably as "multicast" services. For example, the communication may be sent to all users in a particular location (i.e., broadcast) or all users that subscribe to a service (e.g., fewer than all users in a particular service area or cell). Wireless television services continuously broadcast television content regardless of how many users are receiving the service within a covered geographic area. In general, the wireless television service is broadcast with little or no intelligent management. Therefore, spectrum used for television broadcast services is pre-assigned and is always occupied in a particular market. Multicasting may target equipment associated with a predefined customer group and broadcasting may target equipment associated with a subscriber group from public services. However, both multicasting service and broadcasting service deliver data in real time. For example, a later customer access receives the data of an existing delivery but will miss a first portion of the data.

Broadcast data services (e.g., MediaFLO) that use conventional broadcast wireless infrastructure following the television broadcasting model and that require dedicated electromagnetic spectrum and specific network infrastructure, wireless units, and chipsets have been unsuccessful in the marketplace. Accordingly, improved techniques for utilizing electromagnetic spectrum are desired.

Figure 2:
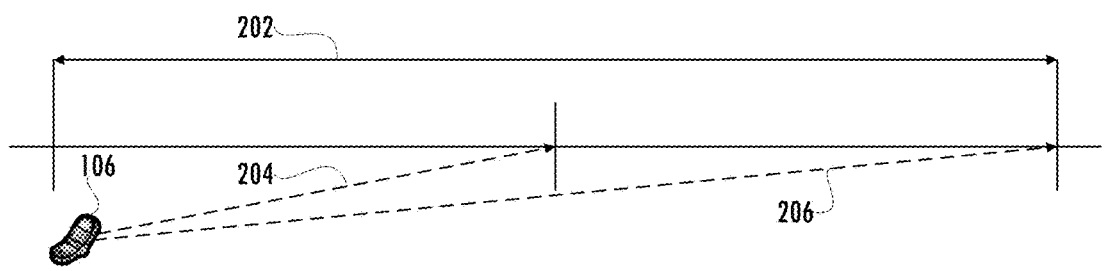
FIG. 2 illustrates an exemplary spectrum sharing for broadcast and other downlink wireless communications.

Referring to FIG. 2, in a typical LTE wireless communications system, eMBMS shares the radio spectrum of the LTE Radio Access Network (RAN) with Downlink Shared Channel (DL-SCH) Orthogonal Frequency-Division Multiple Access (OFDMA) communications (e.g., band 202) but in a segregated frequency band (e.g., 5 MHZ band 204 or 10 MHz band 206). However, in general, eMBMS is allocated bandwidth according to time of day, the eMBMS bandwidth allocation is not dynamically updated, and the allocated bandwidth for broadcasting is limited to carrier aggregation in the Supplemental Downlink (SDL) band.

In general, LTE networks support wireless communications between an eNode-B and wireless communications devices by communicating signals in an OFDMA configuration between cellular RAN towers and wireless handset device antennas. The network dynamically partitions the electromagnetic spectrum allocated to an LTE downlink shared channel into multiple OFDM resource blocks among multiple users for downlink communications (e.g., communications from an eNode-B to user equipment). In the LTE downlink shared channel OFDMA configuration, resource block-based bandwidth allocation and resource block releases correspond to user requests and are updated dynamically.

Although the eMBMS standard provides for sharing spectrum used for LTE services with wireless broadcast services through the MBSFN architecture, that spectrum-sharing does not use the OFDMA configuration and cannot be mixed or combined with OFDMA resource block allocation of the LTE downlink shared channel configuration. Accordingly, the eMBMS-based broadcasting and LTE downlink shared channel OFDMA services may share the same spectrum but cannot share the same format of service configuration. Once a particular portion of spectrum is allocated to a particular service (e.g., LTE downlink shared channel or eMBMS over MBSFN), that portion of spectrum cannot be used by the other service, even though the portion of spectrum is not fully utilized and another service needs access but is without available spectrum. That is, eMBMS broadcasting over the MBSFN may be allocated spectrum resources in a particular market but cannot be allocated by any downlink shared channel OFDMA resources in the same market.

The spectrum utilization and spectral efficiency for the downlink shared channel and eMBMS services differ. For example, the spectrum utilization and spectral efficiency of the LTE downlink shared channel service is relatively high because allocation of OFDMA resource blocks and release of OFDMA resource blocks are based on user needs. In contrast, eMBMS does not follow user needs during operation but rather is configured under the MBSFN architecture, which has fixed spectrum utilization for a designated time over a specified broadcasting band/block, e.g., 5 MHz bandwidth. Even if no broadcasting receivers are in the field, the MBSFN band/block is occupied and cannot be reused by any other wireless communication. Using the MBSFN architecture, eMBMS has relatively less spectrum utilization and spectral efficiency. Even when there are no wireless devices in a particular area, eMBMS RAN operation broadcasts data, which wastes broadcasting power and raises the noise floor in the neighboring RE environment without gaining any service advantages.

Figure 3:
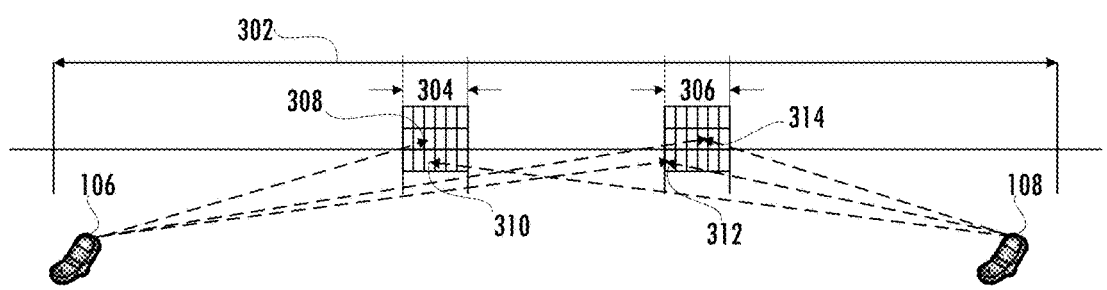
FIG. 3 illustrates an exemplary spectrum sharing for broadcast and other downlink wireless communications consistent with at least one embodiment of the disclosure.

A dynamic wireless multicast service technique facilitates increased spectrum sharing between downlink OFDMA communications services (e.g., LTE downlink shared channel service) and wireless broadcasting services. Referring to FIG. 3, the dynamic wireless multicast service technique shares LTE spectrum 302 and OFDMA resource blocks with both the LTE downlink shared channel and a wireless multicast service (e.g., multicast wireless video streaming delivery and wireless television broadcast delivery). The dynamic wireless multicast service technique allocates and releases OFDMA resource blocks of LTE spectrum 302 according to user demand. The allocation to OFDMA resource blocks uses any available resource block of LTE spectrum 302. For example, channel 304 and channel 306 each include multiple OFDMA resource blocks that may be dynamically configured to provide an LTE multicasting service and other LTE downlink shared channel service (e.g., unicast communications). Channels 304 and 306 include OFDMA resource blocks 308 and 310 for typical (e.g., unicast) downlink shared channel service to user equipment 106 and user equipment 108, respectively, and include OFDMA resource blocks 312 and 314 for wireless multicast service to user equipment 106 and user equipment 108. During system operation, resource blocks of channels 304 and 306 are allocated and released according to user demand. Once released, those resource blocks are available for reallocation to the typical downlink shared channel service or the wireless multicast service based on user demand.

In at least one embodiment, the dynamic wireless multicast service technique uses existing LTE Radio Access Network (RAN) towers, radio spectrum, dynamic OFDMA configurations, and wireless devices. A dynamic wireless multicast service system is a two-way communications system using OFDMA communications to allocate downlink radio resources once there is, at least, one user request for the multicast service (e.g., video stream or broadcasting television channel). Requests from multiple different users to the same multicasting data stream may share the same content resources within all cell coverage in the downlink delivery. In other embodiments, different users that request the same multicasting data stream in different cells use different resources. In at least one embodiment, different users in the same cell requesting the same multicasting data stream will be allocated different electromagnetic spectrum resources based on quality of service achievable for the individual users. If no wireless communications devices in a cell request a specific multicasting or broadcasting stream, the dynamic wireless multicast communications system will release previously-allocated electromagnetic spectrum resources tor other allocations, e.g., LTE data, voice, video streaming or television broadcasting uses. Thus, the electromagnetic spectrum assignments to the wireless multicast service are dynamic and correspond to user requests. In response to a wireless user accessing a wireless multicast service, the system allocates multiple delivery resources in adjacent cells in order to provide continuous service to the wireless user while the user device is in motion.

In at least one embodiment, the dynamic wireless multicast service system provides a wireless user with conventional uplink access (e.g., uplink access consistent with the LTE single-carrier FDMA) in the cell. However, the uplink access may also be assigned to any available nearby cell.

That is, the access cell for the LTE wireless device for uplink communications could be different from multicast delivery cell in general. The wireless multicasting could be assigned to one cell, and associated wireless uplink to the multicasting server could be assigned to another cell. This separation between wireless device uplink and multicast downlink delivery increases flexibility of the implementation.

The dynamic wireless multicast service technique shares the LTE spectrum with a downlink shared channel using the same LTE OFDMA configuration as the downlink shared channel, and dynamically assigns and releases the LTE dynamic wireless multicast service resources to increase spectrum utilization and spectral efficiency without introducing additional electromagnetic interference or loss of service value. The dynamic wireless multicast service technique shares the spectrum with the LTE downlink shared channel on a resource block basis. That is, resource blocks are assigned or released on a demand basis for both LTE downlink shared channel and dynamic wireless multicasting services. In at least one embodiment of the dynamic wireless multicast service technique, electromagnetic spectrum that was previously allocated for separate multicasting may also be configured for communications using OFDMA resource blocks. In at least one embodiment, the dynamic wireless multicast service technique uses LTE-Advanced techniques, e.g., Supplemental DownLink (SDL) spectrum and/or carrier aggregation techniques, to increase bandwidth and realizable bit rates. Carrier aggregation uses multiple component carriers that are associated with a corresponding serving cell (e.g., primary serving cell 515 and secondary serving cell 517 of FIG. 10 corresponding to primary and secondary component carriers) for a particular eNode-B. Each of the serving cells may provide different coverage and OFDMA resource blocks of each serving cell may be scheduled independently. Supplemental DownLink combines paired spectrum (e.g., spectrum including uplink and downlink carriers) with unpaired spectrum (e.g., L-band spectrum including only downlink carriers) to increase the downlink bandwidth for use by dynamic wireless multicasting services. However, carrier aggregation may be used independently of SDL. In at least one embodiment of the system, only one serving cell uses SDL techniques to provide wireless multicasting service along with the downlink shared channel using an OFDMA configuration. In at least one embodiment, the wireless multicast service uses an OFDMA downlink channel and may be configured separately from other downlink communications.

The dynamic wireless multicast service technique may reduce power consumption as compared to an eMBMS broadcasting over the MBSFN technique since the multicast communication is not transmitted in a cell when no wireless receivers are actively receiving the multicasting service within that particular cell coverage area. As a result, when no wireless receivers are actively receiving the broadcasting service within the particular cell coverage area, the dynamic wireless multicast service technique also reduces the noise floor in the electromagnetic environment as compared to the eMBMS broadcasting over the MBSFN technique. If no wireless receivers are actively receiving the multicast service within the cell, the dynamic wireless multicast service technique releases all of the OFDMA resource blocks back to the resource pool, making those OFDMA resource blocks available for other use.

Figure 4:
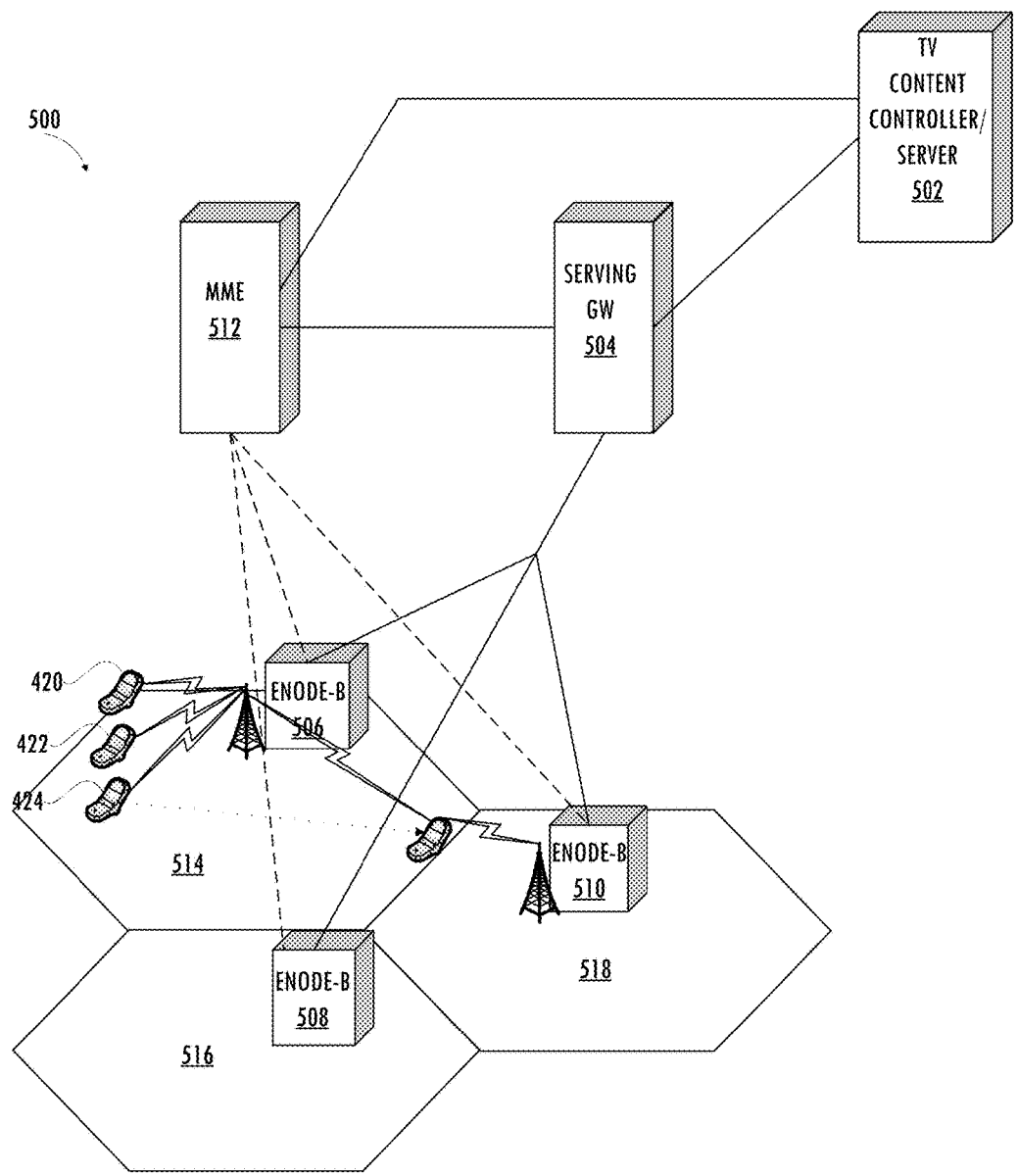
FIG. 4 illustrates a functional block diagram of an exemplary wireless communications network architecture for dynamic wireless multicast communications consistent with at least one embodiment of the disclosure.

Referring to FIG. 4, a dynamic wireless multicast service system operates with a cellular network including cell regions 514, 516, and 518. Each cell region includes a corresponding base station or eNode-B 506, 508, or 510, respectively. Within cell region 514, user equipment 420, 422, and 424 operate compliant with a particular OFDMA communications system (e.g., LTE). Mobility management entity 512 performs signaling and control functions to manage access to network connections by user equipment 420, 422, and 424, assignment of network resources to user equipment 420, 422, and 424, and mobility management functions, e.g., idle mode location tracking, paging, roaming, and handovers. Mobility management entity 512 controls control plane functions related to subscriber and session management for user equipment 420, 422, and 424. In addition, mobility management entity 512 provides security operations including providing temporary identities for user terminals, interacting with television content controller and server 502 for authentication, and negotiation of ciphering and integrity protection algorithms. Serving gateway 504 routes and forwards multicast data packets. Serving gateway 504 also behaves as a mobility anchor during inter-eNode-B handovers and as the anchor for mobility between LTE and other 3GPP technologies. An exemplary television service provider that provides wireless multicast service implements television content controller and server 502 coupled to the serving gateway 504. Television content controller and server 502 controls multicast service and deliver multicast, data (e.g., television programming).

Television content controller and server 502 uses mobility information regarding user equipment 420, 422, and 424 from mobility management entity 512 to manage multicast communication and mobility control of user equipment. In at least one embodiment, if user equipment 424 is receiving multicast data for a particular channel in cell 514 and moves from cell 514 towards another cell (e.g., cell 518) that is not currently multicasting data for that particular channel, then television content controller and server 502 communicates OFDMA resource block assignment information of cell 514 for that particular channel to eNode-B 510 of cell 518. If that OFDMA resource block assignment is available in cell 518, eNode-B 510 will multicast that particular channel on the same OFDMA resource blocks as eNode-B 506. If that resource block assignment is not available in cell 518, eNode-B 510 will allocate different resource blocks for multicast data for that particular channel in cell 518. In other embodiments, television content controller and server 502 may communicate an OFDMA resource block assignment of an existing multicast of data for that particular channel in a cell towards which the user equipment is travelling (e.g., cell 518) to user equipment 424 to facilitate a switch from the OFDMA resource block allocation of cell 514 to the resource block allocation of cell 518. Accordingly, television content controller and server 502 facilitates a smooth transition of multicast service as user equipment travels from one cell to another cell.

Figure 5:
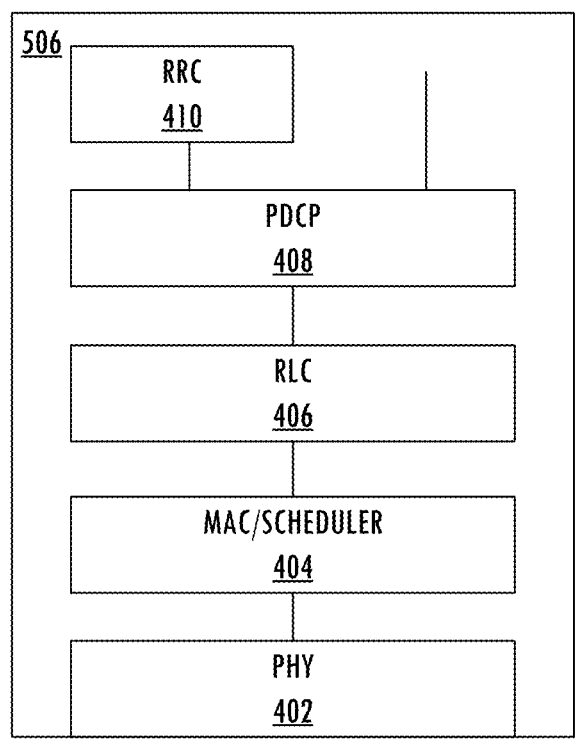
FIG. 5 illustrates a functional block diagram of an exemplary base station for dynamic wireless multicast communications consistent with at least one embodiment of the disclosure.
Figure 6:
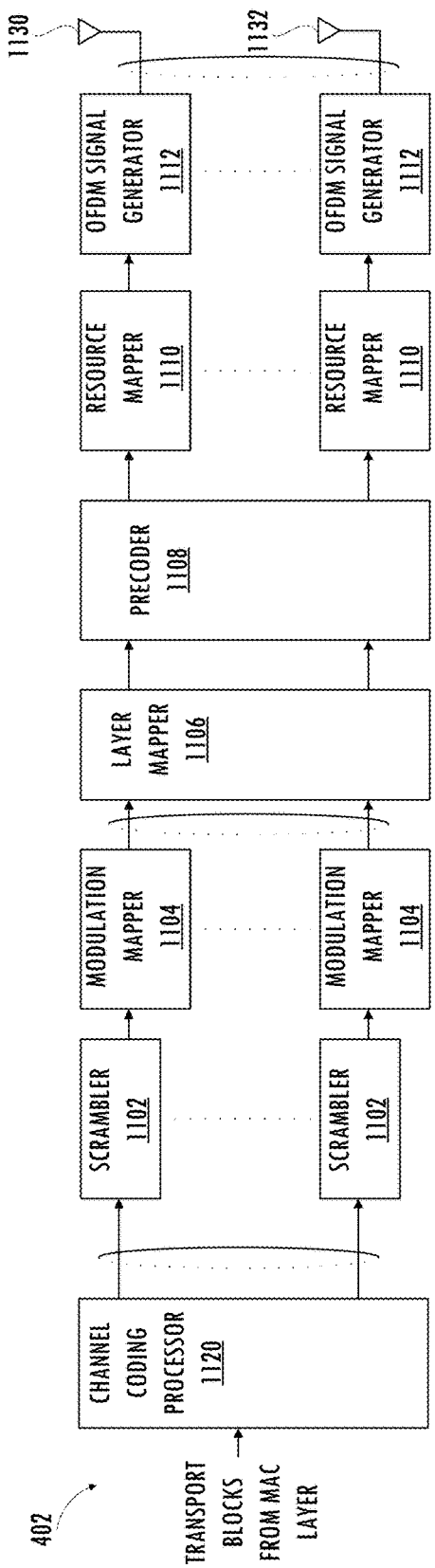
FIG. 6 illustrates a functional block diagram of an exemplary physical interface of an eNode-B transmitter consistent with at least one embodiment of the disclosure.
Figure 7:
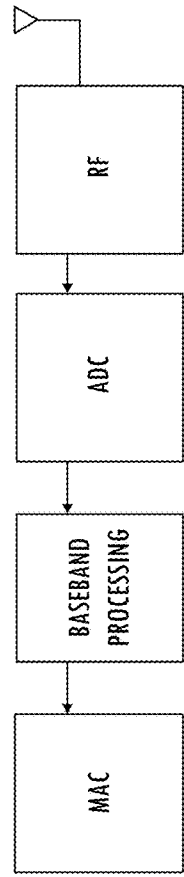
FIG. 7 illustrates a functional block diagram of an exemplary physical interface of user equipment receiver consistent with at least one embodiment of the disclosure.

Referring to FIGS. 4 and 5, an exemplary base station (e.g., eNode-B 506) includes Radio Resource Control module 410, Packet Data Convergence Protocol module 408, Radio Link control module 406, Medium Access Control module (MAC) and scheduler 404, which includes a base station scheduler that dynamically allocates and deallocates resource blocks to particular users in a cell, and PHYsical layer module (PHY) 402. MAC and scheduler 404 organizes data into transport blocks and schedules data for transmission to PHY 402, which then formats the transport blocks into signals for transmission over the air. For example, referring to FIG. 6, an exemplary PHY 402, includes a transmitter path including channel coding processor 1120, scrambler(s) 1102, modulation mappers 1104, layer mappers 1106, precoder 1108, resource mappers 1110, and OFDM signal generators 1112, which generate radio frequency signals for transmission by one or more of antennas 1130 and 1132. FIG. 7 illustrates exemplary user equipment receiver path for receiving and recovering the multicast and downlink communications.

In response to a request from user equipment for multicast service, MAC and scheduler 404 allocates resource blocks to that communication. When additional user equipment requests that service, MAC and scheduler 404 may then send that same resource block allocation information to the additional user, which will configure its receiver to receive that same communication. MAC and scheduler 404 may also release and reclaim resource blocks that are no longer being used by any user equipment in the cell and the base station will then reuse those resource blocks for other communications in the cell. In at least one embodiment, television content controller and server 502 communicates resource block allocations to multicast services across cells to multiple eNode-Bs. A particular multicast channel may be communicated using the same OFDMA resource blocks in multiple cells or may be communicated using different OFDMA resource blocks in different cells.

Figure 8:
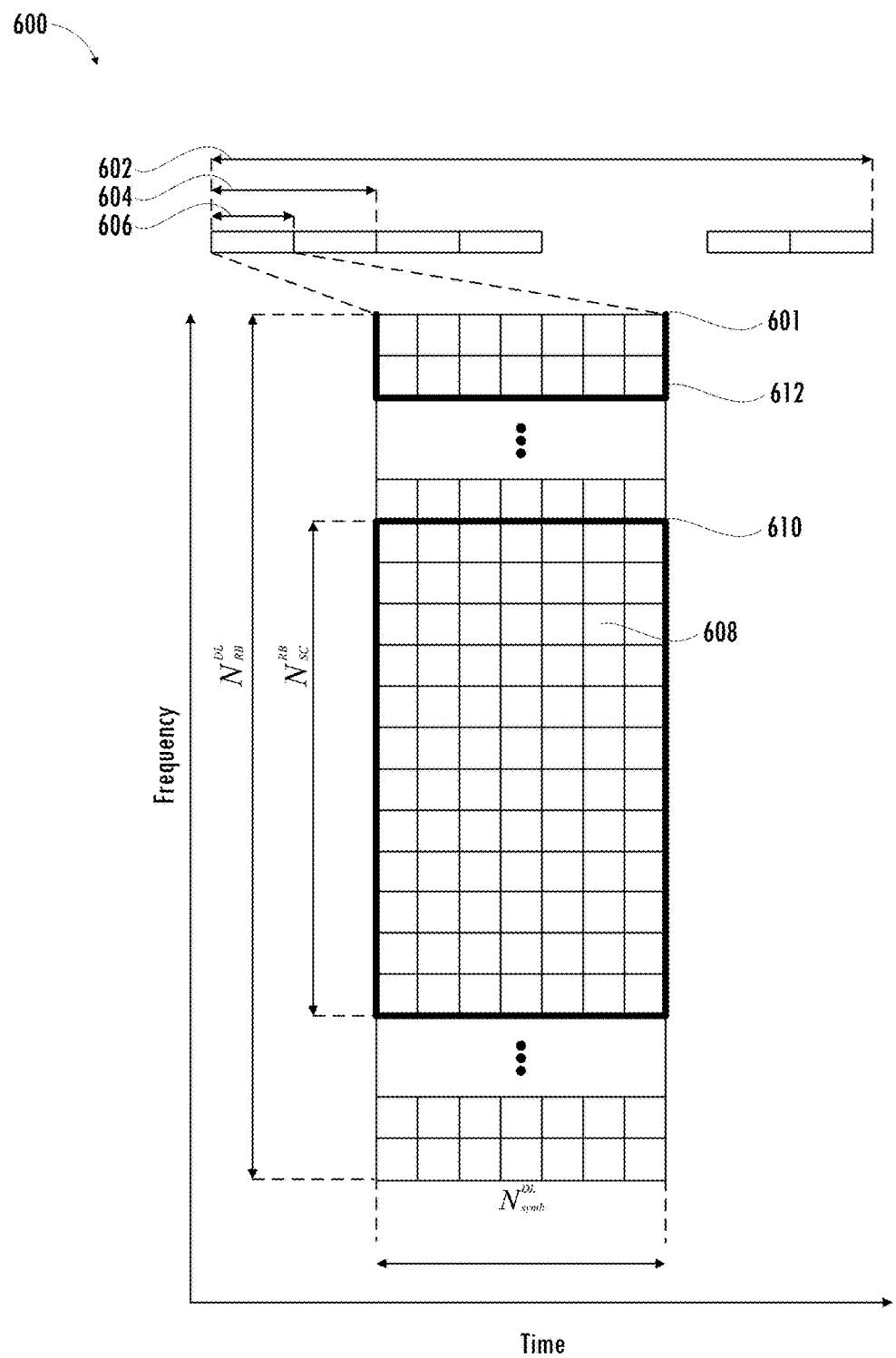
FIG. 8 illustrates frequency and time resource allocation for an orthogonal frequency division multiple access (OFDMA) signal for dynamic wireless multicast communications consistent with at least one embodiment of the disclosure.

Referring to FIG. 8, exemplary downlink OFDMA physical resource allocation 600 for each time slot 606 of radio frame 602 including multiple subframes 604 (e.g., two time slots) is illustrated by resource grid 601. Resource grid 601 includes $N_{RB}^{DL}$ downlink resource blocks, which may vary with a specified bandwidth of a particular embodiment of a communications system. The exemplary downlink OFDMA physical resource allocation includes $N_{sc}^{RB}$ subcarriers in each resource block, and $N_{symb}^{DL}$ downlink OFDM symbols in each resource block. The number of subcarriers varies based on the width of each resource block (e.g., 180 kHz) and the subcarrier spacing, $\Delta f$, of a particular embodiment of a communications system (e.g., $\Delta f$=15 kHz, 15 kHz, or 7.5 kHz, $N_{sc}^{RB}$=12, 12, or 24, respectively, and $N_{symb}^{RB}$=7, 6 or 3, respectively, depending on whether a normal or extended cyclic prefix is used). Each downlink resource block 610 includes $N_{sc}^{RB} \times N_{symp}^{DL}$ resource elements and the downlink resource grid includes $N_{RB}^{DL} \times N_{sc}^{RB} \times N_{symb}^{DL}$ resource elements. Each resource element (e.g., resource element 608) has an associated frequency subcarrier and a symbol index of a time slot of a radio frame. In at least one embodiment of the dynamic wireless multicast system, each antenna of the system has an associated resource grid 600 and the minimum radio resource that may be allocated is the minimum transmission time interval (TTI) in the time domain, which, in some embodiments of the dynamic wireless multicast system, is one subframe 604, corresponding to two resource blocks. Available downlink resource blocks may be allocated to different users, although only one user may be allocated a particular resource block at a particular time. The downlink resource blocks that are allocated to a particular user are communicated by the eNode-B in control information to the user equipment over a control channel or by other suitable technique.

Referring to FIGS. 4, 5, and 8, in at least one embodiment of dynamic wireless multicast service system 500, when user equipment 420 enters cell 514 and/or registers with eNode-B 506 for regular wireless communications service, MAC and scheduler 404 allocates resource block 610 to user equipment 420 for downlink shared channel communications. In response to user equipment 422 entering cell 514 and/or registering with eNode-B 506, eNode-B 506 may present user equipment 422 with multicast service options, e.g., services provided by television content controller and server 502, and user equipment 422 may request those services. Accordingly, scheduler 404 of eNode-B 506 allocates at least resource block 610 for the broadcast television communications. When user equipment 424 enters cell 514 and/or registers with eNode-B 516 for the same television programming selected by user equipment 422, scheduler 404 need not allocate additional resource blocks for that content delivery. Instead, scheduler 404 merely provides user equipment 424 with the same resource allocation that was provided to user equipment 422. For example, eNode-B 506 provides the same downlink control information to user equipment 424 and user equipment 424 begins to receive the same content being received by user equipment 422. Note that user equipment 424 receives television delivery that is already in-progress and is being delivered to eNode-B 506 at the time user equipment 424 requests it. User equipment 424 does not receive any content that was previously delivered to user equipment 422 (i.e., content is not delivered on-demand, but rather user equipment 424 receives content being delivered after the request by user equipment 424. Similarly, user equipment 420 may join the group receiving the television multicast using the same OFDMA resource blocks as user equipment 422 and 424. ENode-B 506 continues to multicast the television content over the OFDMA resource blocks including resource block 610 so long as at least one of user equipment 420, 422, and 424 continues to receive the transmission. When sessions with eNode-B 506 for that television content no longer exist in cell 514, eNode-B 506 may release the resource blocks allocated for the content and eNode-B 506 may reallocate those resource blocks for other downlink communications (e.g., multicast, broadcast, or unicast communications) after those resource blocks are released.

Referring to FIGS. 4 and 8, in at least one embodiment of dynamic wireless multicast service system 500, mobility management entity 512 provides location information to television content controller and server 502. When user equipment 424 approaches a border of a cell, television content controller and server 502 begins to transmit the multicast data to the next adjacent cell and the associated eNode-B allocates resource blocks to the multicast service, if the multicast service is not already in progress in the next adjacent cell. Where possible, eNode-B 510 allocates the same resource blocks for the multicast service in both cells, thereby simplifying handoff from one eNode-B to another eNode-B as the user equipment moves from one cell to a next adjacent cell. The multicast data transmission in cell 518 is synchronous to the multicast data transmission of cell 514. In at least one embodiment, eNode-B 510 allocates different resource blocks for the multicast transmission and communicates the downlink control information to the user equipment when the user equipment is within range of cell 518. Thus, the user equipment processes the received multicast transmission using different resource blocks to continue receiving the multicast transmission as the user equipment transitions from one cell to the next adjacent cell.

In addition, location information received by eNode-B 510 may be used to allocate different resources to different user equipment receiving the same multicast transmission according to realizable quality-of-service. For example, user equipment 424 may be located such that downstream channel characteristics differ from those of user equipment 422 and may be unable to support a high tier quality-of-service (e.g. a quality of service associated with High Definition Television transmissions) that is supportable by the channel characteristics associated with user equipment 422. Accordingly, eNode-B 506 allocates different resource blocks to user equipment 424 and user equipment 422 for the same service, but with different quality of service. If later, channel characteristics change and change the maximum supportable quality of service for user equipment 424 or user equipment 422, eNode-B 506 may adjust the resource block allocations to user equipment 424 or user equipment 422 accordingly.

Figure 9:
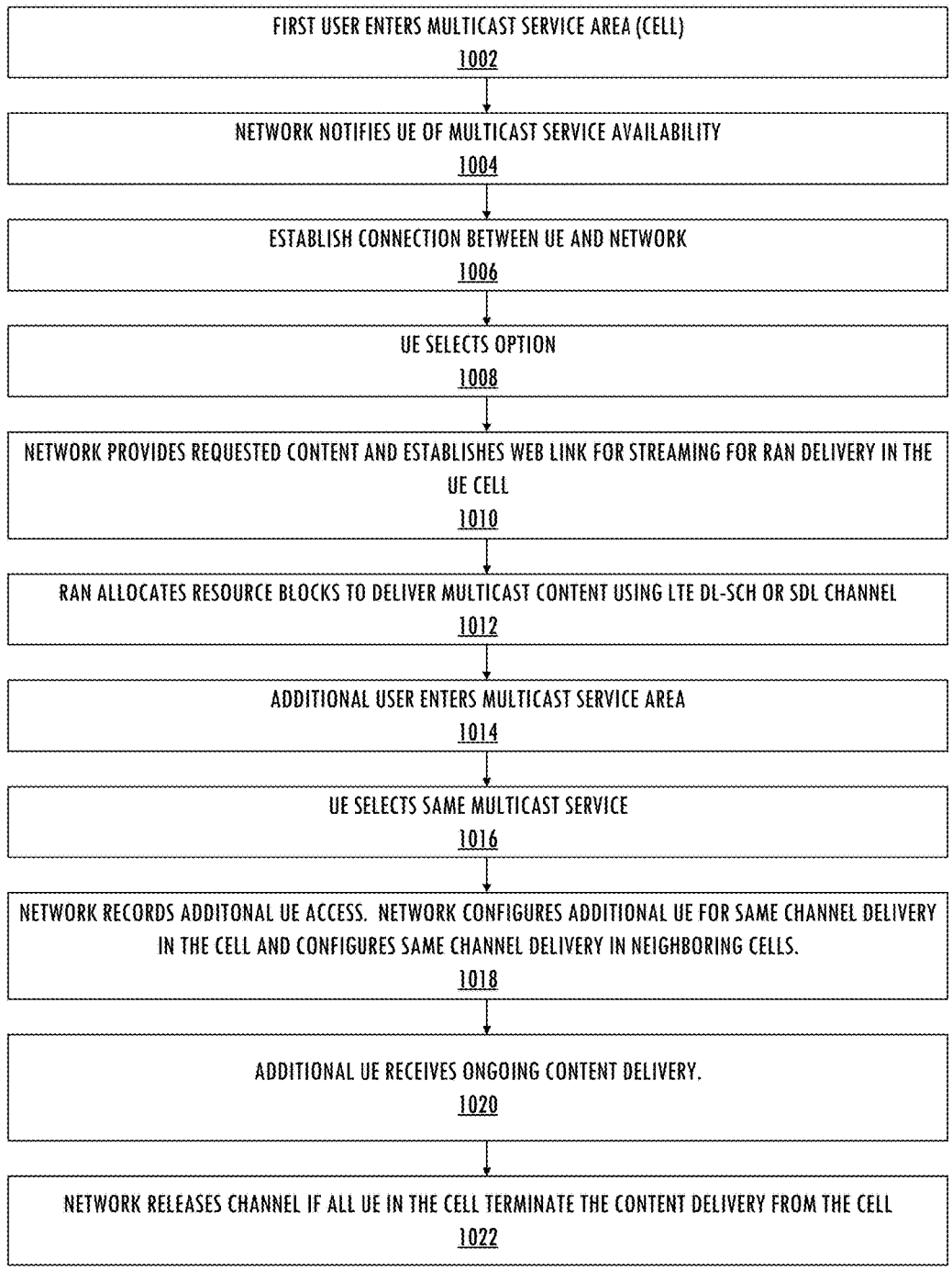
FIG. 9 illustrates exemplary information and control flows for a dynamic wireless multicast service technique consistent with at least one embodiment of the disclosure.

Referring to FIGS. 4 and 9, user equipment 424 enters a multicast service area (e.g., cell 514) and has no ongoing multicast delivery stream (1002). In response, eNode-B 506 sends a network message (e.g., an LTE control message) notifying user equipment 424 that wireless multicast service is available (1004). Meanwhile, eNode-B 506 delivers a menu list of all multicast programs available from television content controller and server 502 to the user equipment so that the user may select any available options to view the content (e.g., a television program). To access the multicast service, user equipment 424 establishes an appropriate network connection with television content controller and server 502 via eNode-B 506 and serving gateway 504 (1006). The user equipment sends a user-selected option to television content controller and server 502 (1008). Television content controller and server 502 makes the requested television service content and web link for video streaming available in the cell for the radio access network of eNode-B 506 to deliver (1010). The radio access network of eNode-B 506 for the multicast service allocates the OFDMA resource blocks to deliver the selected multicast content. ENode-B 506 delivers the multicast content to user equipment 424 using OFDMA resource blocks of the downlink shared channel of the LTE spectrum or is offered in the supplement downlink (SDL) only channel (1012).

In response to additional user equipment (e.g., user equipment 422 or user equipment 420) entering the multicast service area (e.g., cell 514), television content controller and server 502 provides multicast service options (1014), if the additional user selects the same content delivery service as the first user (1016), if MAC and scheduler 404 records the additional access to the same content delivery service and mobility management entity 512 or eNode-B 506 configures the additional user equipment for the content delivery service using the same eNode-B previously established for the first user (1018). In addition, mobility management entity 512 and/or television content controller and server 502 may also send control information to other eNode-Bs to configure the content delivery service on the same channel (or other channel) in neighboring cells (1018). For example, if television content controller and server 502 detects that a mobile multicast receiver is leaving a first cell and moving into a second cell, television content controller and server 502 sends a detection signal to the eNode-B in the second cell to determine any existing multicast channel configuration in the second cell. If the same multicast channel is not already configured in the second cell, television content controller and server 502 issues a command to the eNode-B in the second cell to establish the multicast service and provide seamless support for that multicast communication. The additional user equipment receives the ongoing content delivery using the same configuration as user equipment 424 (1020). Accordingly, user equipment 424 and user equipment 422 can roam among cells and receive uninterrupted multicast service coverage.

In response to all of the user equipment in the cell terminating the multicast service, the MAC and scheduler 404 of eNode-B 506 terminates the content delivery in cell 514 and releases those resource blocks for another use (e.g., multicast, broadcast, or unicast communications) (1022). Accordingly, the disclosed dynamic wireless multicast service technique is dynamic, follows the user requests, and maintains both high spectrum utilization and high spectral efficiency.

Figure 10:
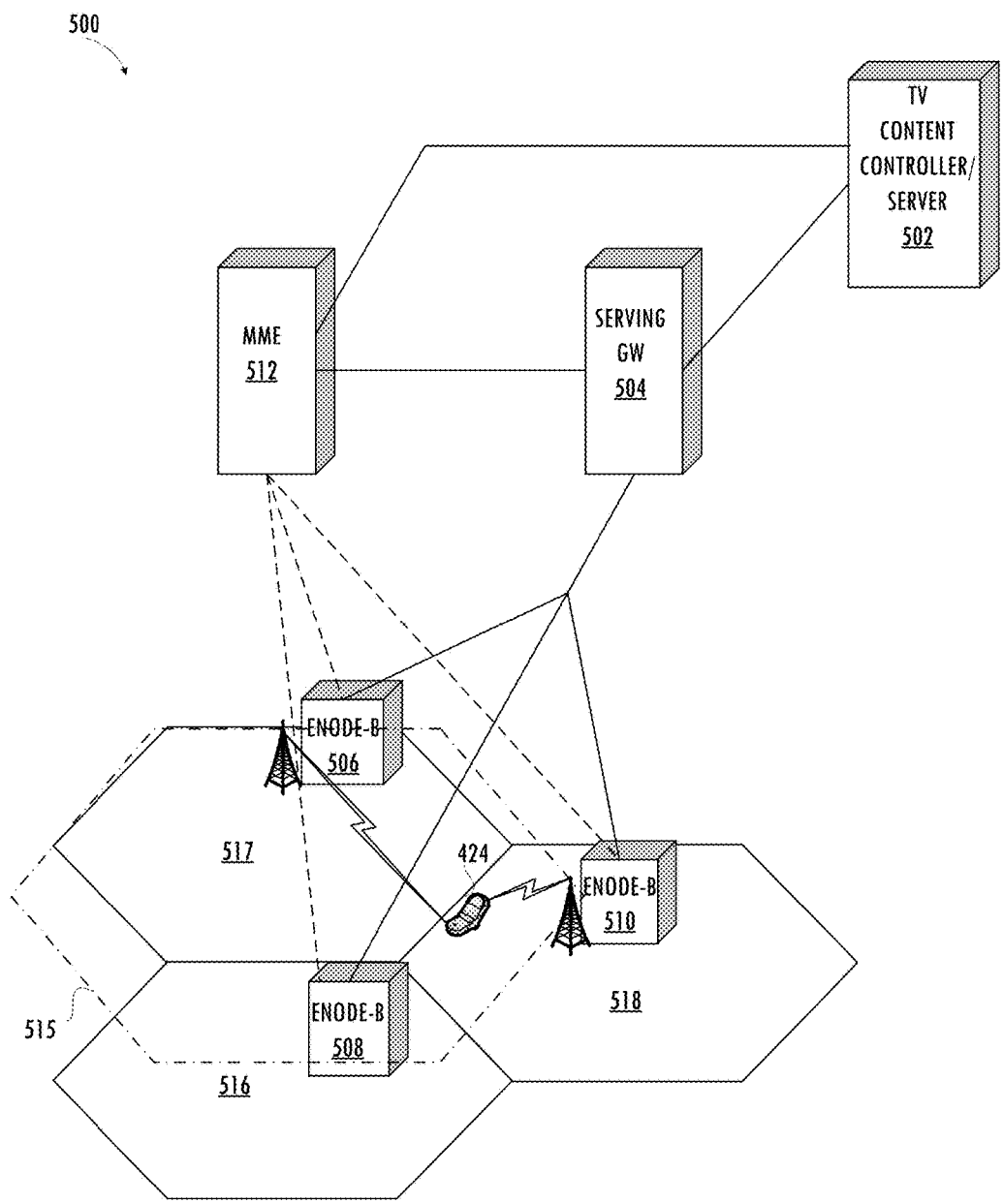
FIG. 10 illustrates a functional block diagram of an exemplary wireless communications network architecture using carrier aggregation for dynamic wireless multicast communications consistent with at least one embodiment of the disclosure.

Note that in at least one embodiment of the dynamic wireless multicast service technique, the multicast content (e.g., video streams or television delivery from television content controller and server 502) channels and the uplink communication channels are decoupled to simplify multicasting configuration techniques, which is useful when downlink and uplink power is not balanced for the multicasting service. Referring to FIG. 10, user equipment 424 is located in multiple service areas simultaneously and may independently communicate with the associated base stations simultaneously. For example, user equipment 424 receives downlink multicasting service, which is transmitted with high downlink power by eNode-B 506 of serving cell 515. However, user equipment 424 cannot transmit at high enough uplink power to effectively communicate uplink multicasting service control signals to eNode-B 506. Instead, while user equipment 424 is in both serving cell 515 and serving cell 518, user equipment 424 communicates multicasting control signals uplink to base station, eNode-B 510 of cell 518, while receiving multicast service downlink from eNode-B 506 of serving cell 515. Video stream multicasting/television broadcasting uplink communications are supported by any LTE channel in any nearby LTE cell. Once the uplink access is completed, the user request is routed through Internet protocol packets to television content controller and server 502 while the uplink electromagnetic spectrum resources are released. Thus, a flexible and cost effective wireless multicasting service technique has been described that dynamically allocates and releases OFDMA resource blocks of the electromagnetic spectrum according to user service demands.

Structures described herein may be implemented using software executing on a processor (which includes firmware) or by a combination of software and hardware. Software, as described herein, may be encoded in at least one tangible computer readable medium. As referred to herein, a tangible computer-readable medium includes at least a disk, tape, or other magnetic, optical, or electronic storage medium.

The description set forth herein is illustrative, and is not intended to limit the scope of the disclosure as set forth in the following claims. For example, while the disclosure describes an embodiment in which a particular wireless network configuration and protocol is described, one of skill in the art will appreciate that the teachings herein can be utilized with other network configurations and communications protocol having dynamically assignable resource blocks. In addition, although the disclosure describes an embodiment in which a television content controller and server and television and video data is multicast, one of skill in the art will appreciate that the teachings herein can be utilized with other application servers and multicast content. Variations and modifications of the embodiments disclosed herein may be made based on the description set forth herein, without departing from the scope and spirit of the disclosure as set forth in the following claims.

What is claimed is:

1. A method comprising:
  transmitting in a first service area, multicast data using a first orthogonal frequency division multiple access (OFDMA) resource block associated with first resource allocation control information in response to a first user request from a first user, for a multicast service, the multicast service sharing spectrum with a physical downlink shared channel;

transmitting the first resource allocation control information to a second user in the first service area in response to the second user requesting the multicast service;

transmitting in a second service area adjacent to the first service area, the multicast data using a second OFDMA resource block associated with second resource allocation control information in response to an indication of movement of the first user toward the second service area, the multicast data being transmitted in the second service area synchronous to the transmitting of the multicast data in the first service area; and providing third resource allocation control information to a third user in the first service area in response to the third user requesting the multicast data, the third resource allocation control information being provided to the third user based on a first position of the third user corresponding to a first quality of service, the first quality of service being different from a second quality of service corresponding to a second position of the first user.

2. The method, as recited in claim 1, further comprising: releasing the first OFDMA resource block in the first service area in response to termination of the multicast service by all users in the first service area.

3. The method, as recited in claim 2, further comprising: transmitting in the first service area, unicast data using the first OFDMA resource block after the releasing.

4. The method, as recited in claim 1, wherein the multicast data is receivable by at least a plurality of receivers in the first service area.

5. The method, as recited in claim 1, wherein the multicast data is receivable by all receivers in the first service area.

6. The method, as recited in claim 1, further comprising: receiving the multicast data by the first user using the first OFDMA resource block when the first user is in the first service area and using the second OFDMA resource block after the first user enters the second service area from the first service area.

7. The method, as recited in claim 1, wherein the first OFDMA resource block includes a plurality of resource elements, each resource element being defined by a frequency subcarrier and a symbol index of a time slot of a radio frame.

8. The method, as recited in claim 1, further comprising: receiving in the second service area, a multicast service control signal from the first user, the first user simultaneously being in the first service area for receiving the multicast data from a first multicast service unit and in the second service area for transmitting multicast control signals to a second multicast service unit.

9. The method, as recited in claim 1, wherein the multicast service and the physical downlink shared channel are assigned resource blocks or release resource blocks in shared spectrum on a demand basis.

10. The method, as recited in claim 1, wherein the multicast service for the first user and a multicast uplink service to a multicasting server for the first user are assigned to different service areas.

11. An apparatus comprising:
a base station scheduler configured to schedule transmission of multicast data to first user equipment in a first service area using a first orthogonal frequency division multiple access (OFDMA) resource block associated with first resource allocation control information in response to a first user request from the first user equipment, for multicast service, the multicast service sharing spectrum with a physical downlink shared channel;

a transmitter configured to provide the first resource allocation control information to second user equipment in the first service area in response to a second user request for the multicast service;

a multicast service unit configured to generate a control signal based on position information for user equipment received from a mobility management entity; and a second base station scheduler configured to schedule transmission of the multicast data using a second OFDMA resource block associated with second resource allocation control information based on the control signal indicating the first user equipment entering a second service area, the multicast data being transmitted in the second service area synchronous to the transmitting of the multicast data in the first service area, wherein the base station scheduler is further configured to schedule communications of the multicast data with third user equipment in the first service area using a third OFDMA resource block in response to the third user equipment requesting the multicast data, the third OFDMA resource block being scheduled to the third user equipment based on a first quality of service corresponding to a first position of the third user equipment, the first quality of service being different from a second quality of service corresponding to a second position of the first user equipment.

12. The apparatus, as recited in claim 11, wherein the base station scheduler is configured to release the first OFDMA resource block in the first service area in response to termination of the multicast service in the first service area by all users in the first service area.

13. The apparatus, as recited in claim 12, wherein the base station scheduler is configured to schedule communications of unicast data using the first OFDMA resource block in the first service area after release of the first OFDMA resource block.

14. The apparatus, as recited in claim 11, further comprising:
a base station comprising the base station scheduler and the transmitter;
a gateway configured to provide the multicast data to the base station; and
the multicast service unit configured to provide the multicast data to the gateway,
wherein the transmitter is configured to provide the multicast data to the first user equipment and the second user equipment using the first OFDMA resource block.

15. The apparatus, as recited in claim 11, further comprising:
a base station comprising the base station scheduler and the transmitter;
a second base station configured to receive multicast service control signals from the first user equipment, the first user equipment being in the first service area for multicast service from the multicast service unit and the first user equipment being in the second service area for transmitting multicast control signals to the multicast service unit.

* * * * *